United States Patent
Tanaka et al.

(10) Patent No.: US 11,801,661 B2
(45) Date of Patent: Oct. 31, 2023

(54) PAINT SUBSTITUTE FILM, COMPOSITE FILM, LAMINATED METAL PLATE, PROCESSED ARTICLE, AND MOLDED ARTICLE

(71) Applicant: TOYOBO CO., LTD., Osaka (JP)

(72) Inventors: Yoshitaka Tanaka, Inuyama (JP); Koji Kubo, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/640,943

(22) PCT Filed: Jul. 10, 2020

(86) PCT No.: PCT/JP2020/027077
§ 371 (c)(1),
(2) Date: Mar. 7, 2022

(87) PCT Pub. No.: WO2021/049153
PCT Pub. Date: Mar. 18, 2021

(65) Prior Publication Data
US 2022/0355570 A1   Nov. 10, 2022

(30) Foreign Application Priority Data

Sep. 13, 2019   (JP) .................................. 2019-166989

(51) Int. Cl.
*B32B 7/023* (2019.01)
*B32B 15/09* (2006.01)
(Continued)

(52) U.S. Cl.
CPC .............. *B32B 7/023* (2019.01); *B32B 15/09* (2013.01); *B32B 27/08* (2013.01); *B32B 27/20* (2013.01);
(Continued)

(58) Field of Classification Search
CPC .. B32B 7/00–7/14; B32B 27/00–27/42; B32B 2264/1022; B32B 2264/1023
See application file for complete search history.

(56) References Cited

U.S. PATENT DOCUMENTS

| | | | |
|---|---|---|---|
| 4,810,540 A | 3/1989 | Ellison et al. | |
| 2004/0253421 A1* | 12/2004 | Truog | B32B 27/34 |
| | | | 428/195.1 |

(Continued)

FOREIGN PATENT DOCUMENTS

| | | | | |
|---|---|---|---|---|
| EP | 1388581 A1 * | 2/2004 | ............. | B32B 27/18 |
| JP | S63-123469 A | 5/1988 | | |

(Continued)

OTHER PUBLICATIONS

The International Bureau of WIPO, International Preliminary Report on Patentability in International Patent Application No. PCT/JP2020/027077 (dated Mar. 15, 2022).

(Continued)

*Primary Examiner* — Prashant J Khatri
(74) *Attorney, Agent, or Firm* — Leydig, Voit & Mayer, Ltd.

(57) ABSTRACT

A paint substitute film comprises a base film, a colored layer, and a hard coat layer, wherein the base film, the colored layer, and the hard coat layer are laminated in this order. The base film contains thermoplastic resin and concealing material. Refractive index of the concealing material is not less than 1.70. Scattering coefficient from wavelength 400 nm to 700 nm of the base film is not less than 0.20 $\mu m^{-1}$. Contrast ratio of the base film when at 20% elongation is not less than 0.70.

18 Claims, 1 Drawing Sheet

(51) Int. Cl.
  *B32B 27/08* (2006.01)
  *B32B 27/20* (2006.01)
  *B32B 27/36* (2006.01)
  *B32B 38/00* (2006.01)

(52) U.S. Cl.
  CPC ...... *B32B 27/36* (2013.01); *B32B 2038/0028* (2013.01); *B32B 2255/10* (2013.01); *B32B 2255/26* (2013.01); *B32B 2264/1022* (2020.08); *B32B 2264/1052* (2020.08); *B32B 2307/418* (2013.01); *B32B 2307/704* (2013.01); *B32B 2367/00* (2013.01); *B32B 2605/08* (2013.01)

(56) References Cited

U.S. PATENT DOCUMENTS

| | | | |
|---|---|---|---|
| 2007/0231576 A1* | 10/2007 | Davis | B32B 27/365 428/412 |
| 2010/0059167 A1 | 3/2010 | McGuire, Jr. | |
| 2010/0273019 A1 | 10/2010 | Kitaike et al. | |
| 2014/0162032 A1 | 6/2014 | Egashira et al. | |
| 2015/0321452 A1 | 11/2015 | Egashira | |
| 2021/0187868 A1 | 6/2021 | Tanaka | |

FOREIGN PATENT DOCUMENTS

| | | | |
|---|---|---|---|
| JP | 3333677 B2 | 10/2002 | |
| JP | 2013-014027 A | 1/2013 | |
| WO | WO-9964235 A1 * | 12/1999 | ............ B32B 15/08 |
| WO | WO 2019/078369 A1 | 4/2019 | |

OTHER PUBLICATIONS

Japanese Patent Office, International Search Report in International Patent Application No. PCT/JP2020/027077 (dated Sep. 15, 2020).

China National Intellectual Property Administration, First Office Action in Chinese Patent Application No. 202080063593.X (dated May 16, 2023).

European Patent Office, Extended European Search Report in European Patent Application No. 208634451 (dated Aug. 31, 2023).

* cited by examiner

PAINT SUBSTITUTE FILM, COMPOSITE FILM, LAMINATED METAL PLATE, PROCESSED ARTICLE, AND MOLDED ARTICLE

TECHNICAL FIELD

The present invention relates to a paint substitute film, composite film, laminated metal plate, processed article, and molded article.

BACKGROUND ART

Coatings may be applied to members, e.g., exterior members (e.g., fenders, bumpers, hoods, hubcaps, etc.), that make up cars. To carry out coating, spraying of a coating onto a substrate, i.e., spray coating, is typically employed.

But because coatings employed for spray coating contain volatile organic compounds (VOCs), spray coating has a large environmental impact. Moreover, because spray coating is carried out in repetitive fashion, persons performing spray coating will require much space.

A number of methods permitting elimination of use of spray coating at exterior members for cars have already been proposed (see, e.g., Patent Reference Nos. 1 and 2). For example, at Patent Reference No. 1, a method for manufacturing an exterior member has been proposed in which insert molding is employed to cause a film insert and a resin to form an integral structure. In accordance with this method, to conceal a substrate in the form of resin, a film insert having a transparent base sheet, a metallic layer disposed above the base sheet, and a concealing layer that contains binder and pigment is capable of decorating the substrate and is capable of protecting the substrate. On the other hand, at Patent Reference No. 2, a method for causing a decorative sheet material having a transparent cast film (at Patent Reference No. 2, the cast film is also referred to as an outer layer), a colored coating disposed above the cast film, and an adhesive membrane disposed above the colored coating to be affixed to a metal substrate has been proposed.

PRIOR ART REFERENCES

Patent Documents

Patent Reference No. 1: Japanese Patent No. 3333677
Patent Reference No. 2: Japanese Patent Application Publication Kokai No. S63[1988]-123469

SUMMARY OF THE INVENTION

Problem to be Solved by Invention

With a method such as that of Patent Reference No. 1, whereas the concealing layer may undergo partial elongation during insert molding, because the concealing layer is quite a bit thinner than the base sheet, ability to conceal the color of the substrate, i.e., hiding power, will be greatly reduced at elongated portions of the concealing layer. As a result, there will be occurrence of large nonuniformities in concealability. And with the method of Patent Reference No. 2 as well, because the colored coating is quite a bit thinner than the cast film, when there is partial elongation of the colored coating, hiding power will be greatly reduced at elongated portions of the colored coating. As a result, there will be occurrence of large nonuniformities in concealability.

It is an object of the present invention to provide a paint substitute film and a composite film that are not only capable of decorating a substrate while concealing the color of the substrate but are also capable of protecting the substrate and will moreover permit suppression of nonuniformities in concealability which might otherwise occur due to partial elongation. It may also be an object of the present invention to provide a laminated metal plate, processed article, or molded article that is provided with a paint substitute film.

Means for Solving Problem

To solve these problems, the present invention is equipped with the constitution at item 1, below.

Item 1

A paint substitute film comprising a base film, a colored layer, and a hard coat layer;
   wherein the base film, the colored layer, and the hard coat layer are laminated in this order;
   wherein the base film contains thermoplastic resin and concealing material;
   wherein refractive index of the concealing material is not less than 1.70;
   wherein scattering coefficient from wavelength 400 nm to 700 nm of the base film is not less than 0.20 $\mu m^{-1}$; and
   wherein contrast ratio of the base film when at 20% elongation is not less than 0.70.

In accordance with item 1, the base film contains thermoplastic resin and concealing material. Here, where it is said that "the base film contains thermoplastic resin and concealing material," in a situation in which the base film includes a plurality of layers, this means that at least one layer among the plurality of layers contains thermoplastic resin and concealing material.

"Refractive index" refers to the absolute refractive index. Taking the length of the base film (which may be a test piece obtained from the base film) before it is made to undergo elongation to be 100%, "20% elongation" means that the base film is elongated so as to be a length which is 120%.

"Scattering coefficient" indicates the Kubelka-Munk scattering coefficient, which may be calculated according to Formula (1), below.

$$S=\{(1-T)/T\}/d \quad (1)$$

Here, S indicates the scattering coefficient and is expressed in $\mu m^{-1}$. T indicates the average value of the total luminous transmittance from wavelength 400 nm to 700 nm at the base film (which may be a sample cut from the base film) and is expressed in %. d indicates the thickness of the base film (which may be a sample cut from the base film) and is expressed in $\mu m$.

"Contrast ratio" is the value calculated by thermocompressively bonding the base film to a fractional hiding power test paper having a black portion and a white portion (more specifically, a fractional hiding power test paper in accordance with JIS K 5600 that has a black portion and a white portion) to fabricate a fractional hiding power test paper to which the base film is attached, cutting samples from the black portion and the white portion of the fractional hiding power test paper to which the base film is attached, determining the average values of total luminous reflectance from wavelength 400 nm to 700 nm for these samples, and dividing the average value (i.e., the average value of the total luminous reflectance from wavelength 400 nm to 700 nm) for the sample cut from the black portion by the average value (i.e., the average value of the total luminous reflectance from wavelength 400 nm to 700 nm) for the sample cut from the white portion.

As a result of causing the base film to contain thermoplastic resin in accordance with item 1, it is possible for an external force to cause elongation of the base film.

And by causing the base film to contain concealing material, because this will it make it possible for the base film to have hiding power, it will be able to conceal the color of a substrate (e.g., a metal plate for a car). And not only that, but by causing the base film to contain concealing material, because it will be possible when the base film undergoes partial elongation to prevent the thickness of elongated portions from becoming excessively small, this will make it possible to suppress reduction in hiding power that might otherwise occur at elongated portions. As a result, this will make it possible to suppress nonuniformities in concealability that might otherwise occur due to partial elongation. In addition, by causing the refractive index of the concealing material to be not less than 1.70, because this will make it possible to increase the amount of light that is reflected at the surface of the concealing material, it will make it possible to effectively impart the base film with hiding power.

Moreover, by causing the scattering coefficient from wavelength 400 nm to 700 nm of the base film to be not less than 0.20 $\mu m^{-1}$, because the hiding power of the base film with respect to visible light will be excellent, this will make it possible to effectively conceal the color of the substrate. Here, what is referred to as the scattering coefficient is the scattering coefficient appearing in the equation according to the Kubelka-Munk theory. The Kubelka-Munk scattering coefficient is an index of hiding power, a high scattering coefficient indicating a high hiding power.

Moreover, by causing the contrast ratio of the base film when at 20% elongation to be not less than 0.70, because this will make it possible to suppress alteration of the contrast ratio that might otherwise occur when the base film undergoes partial elongation, this will make it possible to effectively suppress nonuniformities in concealability that might otherwise occur due to partial elongation. Here, by causing a metal plate (e.g., steel plate, aluminum alloy plate, etc.) for a car to be provided with a paint substitute film to obtain a laminated metal plate, it will be possible where the laminated metal plate is press molded to an exterior member for a car to particularly effectively suppress nonuniformities in concealability. The reason for this is that whereas when the laminated metal plate is press molded thereto it will be the case that the paint substitute film will undergo partial elongation, such elongation will at most be on the order of 20%.

In addition, by causing the paint substitute film to be provided with a colored layer, this will make it possible to decorate the substrate.

Additionally, by causing the paint substitute film to be provided with a hard coat layer, this will make it possible to protect the colored layer.

It is preferred that the invention be further equipped with the constitutions at item 2, below, and therebelow.

Item 2

The paint substitute film according to item 1 wherein a difference between a maximum value of total luminous transmittance from wavelength 400 nm to 700 nm at the base film and a minimum value of total luminous transmittance from wavelength 400 nm to 700 nm thereat is not greater than 10%.

As a result of causing the difference between the maximum value and the minimum value of total luminous transmittance from wavelength 400 nm to 700 nm at the base film to be not greater than 10% in accordance with item 2, it will be possible to reduce nonuniformity in total luminous transmittance within the band of wavelengths for visible light.

Item 3

The paint substitute film according to item 1 or 2 wherein the thermoplastic resin comprises crystalline resin.

As a result of causing the thermoplastic resin to comprise crystalline resin in accordance with item 3, it will be possible to suppress nonuniformity in the elongation of the base film. The reason for this is that it is the case with crystalline resins that because the fact that the slope of the stress-strain curve (more specifically, a stress-strain curve in which stress is plotted on the vertical axis, and strain is plotted on the horizontal axis) tends not to decrease with increasing strain means that there is a tendency for stress at the portion thereof at which elongation begins to occur to effectively increase, the portion thereof at which elongation begins to occur is such that elongation is less likely to occur.

Item 4

The paint substitute film according to any of items 1 through 3 wherein thickness of the base film is 10 μm to 150 μm.

By causing the thickness of the base film to be 10 μm to 150 μm in accordance with item 4, because it will be possible when the base film undergoes partial elongation to effectively prevent the thickness of elongated portions from becoming excessively small, this will make it possible to effectively suppress reduction in hiding power that might otherwise occur at elongated portions. As a result, this will make it possible to effectively suppress nonuniformities in concealability that might otherwise occur due to partial elongation.

Item 5

A composite film comprising
  the paint substitute film according to any of items 1 through 4; and
  a protective film which is disposed over the hard coat layer of the paint substitute film.

By causing the composite film to be provided with a protective film which is disposed over the hard coat layer of the paint substitute film in accordance with item 5, this will make it possible to protect the paint substitute film.

Item 6

A laminated metal plate comprising
  a metal plate; and
  the composite film according to item 5 or the paint substitute film according to any of items 1 through 4 which is laminated to the metal plate.

By causing a laminated metal plate to be provided with a metal plate and with a composite film or a paint substitute film which is laminated to the metal plate in accordance with item 6, this will not only make it possible to effectively conceal the color of the metal plate but will also make it possible to decorate the metal plate and will also make it possible protect the metal plate. Moreover, this will make it possible to suppress nonuniformities in concealability that might otherwise occur due to partial elongation of the base film that makes up the paint substitute film.

Item 7

A processed article wherein the laminated metal plate according to item 6 has undergone press processing.

By causing this to be a processed article wherein a laminated metal plate has undergone press processing in accordance with item 7, because it will be possible to reduce nonuniformities in concealability that might otherwise occur due to partial elongation of the base film, it will have an excellent external appearance.

Item 8
A processed article comprising
a metal member for a car; and
the composite film according to item 5 or the paint substitute film according to any of items 1 through 4 which is disposed on at least a portion of a surface of the metal member.

By causing a processed article to be provided with a metal member for a car and with a composite film or a paint substitute film which is disposed on at least a portion of the surface of the metal member in accordance with item 8, this will not only make it possible to effectively conceal the color of the metal member but will also make it possible to decorate the metal member and will also make it possible protect the metal member. Moreover, this will make it possible to suppress nonuniformities in concealability that might otherwise occur due to partial elongation of the base film that makes up the paint substitute film.

Item 9
A molded article comprising
a resin member for a car; and
the composite film according to item 5 or the paint substitute film according to any of items 1 through 4 which is disposed on at least a portion of a surface of the resin member.

By causing a molded article to be provided with a resin member for a car and with a composite film or a paint substitute film which is disposed on at least a portion of the surface of the resin member in accordance with item 9, this will not only make it possible to effectively conceal the color of the resin member but will also make it possible to decorate the resin member and will also make it possible protect the resin member. Moreover, this will make it possible to suppress nonuniformities in concealability that might otherwise occur due to partial elongation of the base film that makes up the paint substitute film.

Effect of the Invention

A paint substitute film in accordance with the present invention will not only be capable of decorating a substrate while concealing the color of the substrate but will also be capable of protecting the substrate and will moreover permit suppression of nonuniformities in concealability which might otherwise occur due to partial elongation. A composite film in accordance with the present invention will likewise not only be capable of decorating a substrate while concealing the color of the substrate but will also be capable of protecting the substrate and will moreover permit suppression of nonuniformities in concealability which might otherwise occur due to partial elongation.

EMBODIMENTS FOR CARRYING OUT THE INVENTION

Below, description is given with respect to embodiments of the present invention.

1. Composite Film

Figure 1:
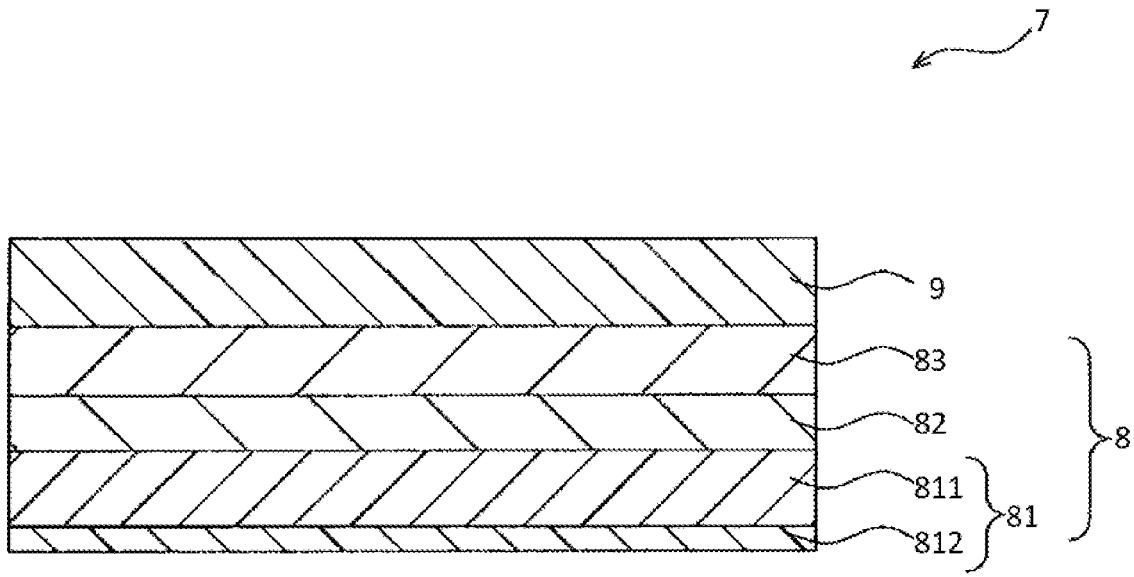
FIG. 1 Schematic sectional diagram of a composite film in accordance with the present embodiment.

As shown in FIG. 1, composite film 7 in accordance with the present embodiment comprises paint substitute film 8 and protective film 9. Protective film 9 is provided over paint substitute film 8. More specifically, protective film 9 is provided over hard coat layer 83 of paint substitute film 8.

1.1. Paint Substitute Film

Paint substitute film 8 comprises base film 81, colored layer 82, and hard coat layer 83. Base film 81, colored layer 82, and hard coat layer 83 are laminated in this order.

1.1.1. Base Film

Base film 81 may have the role of concealing the color of the substrate and the role of causing adhesion between the substrate and colored layer 82.

The scattering coefficient from wavelength 400 nm to 700 nm at base film 81 is not less than 0.20 $\mu m^{-1}$, it being preferred that this be not less than 0.22 $\mu m^{-1}$. When this is not less than 0.20 $\mu m^{-1}$, because the hiding power of base film 81 with respect to visible light will be excellent, it will be able to effectively conceal the color of the substrate. While there is no particular limitation with respect to the upper limit of the range in values for the scattering coefficient, it is for example preferred that this be not greater than 0.50 $\mu m^{-1}$, and more preferred that this be not greater than 0.40 $\mu m^{-1}$. Here, what is referred to as the scattering coefficient is the scattering coefficient appearing in the equation according to the Kubelka-Munk theory. The Kubelka-Munk scattering coefficient is an index of hiding power, a high scattering coefficient indicating a high hiding power. The scattering coefficient can be controlled depending on concealing material type and concealing material content, for example. For example, inasmuch as a high refractive index at a concealing material will cause the ratio of the refractive index of the concealing material to the refractive index of a thermoplastic resin (i.e., concealing material refractive index/thermoplastic resin refractive index) to be high, because this increases the amount of light that is reflected at the surface of the concealing material, it will result in a tendency for the scattering coefficient to increase. There is a tendency for a high concealing material content to result in a high scattering coefficient.

The scattering coefficient is calculated using Formula (1), below.

$$S=\{(1-T)/T\}/d \quad (1)$$

Here, S indicates the scattering coefficient and is expressed in $\mu m^{-1}$. T indicates the average value of the total luminous transmittance from wavelength 400 nm to 700 nm at base film 81 (which may be a sample cut from base film 81) and is expressed in %. d indicates the thickness of base film 81 (which may be a sample cut from base film 81) and is expressed in $\mu m$.

It is preferred that the contrast ratio (more specifically, the contrast ratio when unelongated) of base film 81 be not less than 0.70, and more preferred that this be not less than 0.75. When this is not less than 0.70, because the hiding power of base film 81 will be excellent, it will be able to effectively conceal the color of the substrate. The contrast ratio of base film 81 might be less than 1.00, or it might be less than 0.98.

Here, what is referred to as contrast ratio is the value calculated by thermocompressively bonding base film 81 to a fractional hiding power test paper having a black portion and a white portion (more specifically, a fractional hiding power test paper in accordance with JIS K 5600 that has a black portion and a white portion) to fabricate a fractional hiding power test paper to which base film 81 is attached, cutting samples from the black portion and the white portion of the fractional hiding power test paper to which base film 81 is attached, determining the average values of total luminous reflectance from wavelength 400 nm to 700 nm for these samples, and dividing the average value (i.e., the average value of the total luminous reflectance from wavelength 400 nm to 700 nm) for the sample cut from the black portion by the average value (i.e., the average value of the total luminous reflectance from wavelength 400 nm to 700 nm) for the sample cut from the white portion.

The contrast ratio of base film 81 when at an elongation of 20% is not less than 0.70, it being preferred that this be not less than 0.75. By causing this to be not less than 0.70, because it will make it possible to suppress alteration of the contrast ratio that might otherwise occur when base film 81 undergoes partial elongation, this will make it possible to effectively suppress nonuniformities in concealability that might otherwise occur due to partial elongation. Here, by causing a metal plate (e.g., steel plate, aluminum alloy plate, etc.) for a car to be provided with paint substitute film 8 to obtain a laminated metal plate, it will be possible where the laminated metal plate is press molded to an exterior member for a car to particularly effectively suppress nonuniformities in concealability. The reason for this is that whereas when the laminated metal plate is press molded thereto it will be the case that paint substitute film 8 will undergo partial elongation, such elongation will at most be on the order of 20%. The contrast ratio of base film 81 when at an elongation of 20% might be less than 1.00, or it might be less than 0.98. The contrast ratio can be controlled depending on concealing material type, concealing material content, and base film 81 thickness (more specifically, the thickness of first layer 811, described below, which has the role of concealing the color of the substrate), for example. For example, there is a tendency for a high concealing material refractive index to result in a high contrast ratio. There is a tendency for a high concealing material content to result in a high contrast ratio. There is a tendency for a large base film 81 thickness to result in a high contrast ratio.

It is preferred that the difference between the maximum value of the total luminous transmittance from wavelength 400 nm to 700 nm at base film 81 and the minimum value of the total luminous transmittance from wavelength 400 nm to 700 nm thereat (hereinafter "difference in transmittance") be not greater than 10%. When this is not greater than 10%, it will be possible to reduce nonuniformity in total luminous transmittance within the band of wavelengths for visible light.

It is preferred that the difference in transmittance of base film 81 when at an elongation of 20% (hereinafter "difference in transmittance at 20%") be not greater than 10%.

It is preferred that the average value of the total luminous transmittance from wavelength 400 nm to 700 nm at base film 81 (hereinafter "average transmittance") be not greater than 20%, more preferred that this be not greater than 18%, and still more preferred that this be not greater than 15%. When this is not greater than 20%, because it will be possible to reduce the amount of light that arrives at the substrate, it will be possible to reduce the influence of the color of the substrate (more specifically, the effect that the color of the substrate has on the hue of paint substitute film 8). The average transmittance might be not less than 1%, or it might be not less than 3%.

It is preferred that the absolute value of the difference between the average transmittance of base film 81 when at an elongation of 20% (hereinafter "average transmittance at 20%") and the average transmittance (more specifically, the average transmittance when unelongated; i.e., the initial average transmittance) thereof be not greater than 10%, more preferred that this be not greater than 7%, and still more preferred that this be not greater than 5%.

It is preferred that the average value of the total luminous reflectance from wavelength 400 nm to 700 nm at base film 81 (hereinafter "average reflectance") be not less than 50%. The average reflectance might be not greater than 98%, or it might be not greater than 95%.

It is preferred that the average reflectance of base film 81 when at an elongation of 20% (hereinafter "average reflectance at 20%") be not less than 50%. The average reflectance at 20% elongation might be not greater than 98%, or it might be not greater than 95%.

It is preferred that the tensile stress of base film 81 when at an elongation of 20% at 100° C. be not less than 1 MPa, and more preferred that this be not less than 3 MPa. Causing this to be not less than 1 MPa will make it possible to suppress nonuniformity in the elongation of base film 81. It is preferred that the tensile stress thereof be not greater than 50 MPa, and more preferred that this be not greater than 30 MPa.

It is preferred that thickness of base film 81 be not less than 10 μm, more preferred that this be not less than 15 μm, and still more preferred that this be not less than 20 μm. By causing this to be not less than 10 μm, because it will be possible when base film 81 undergoes partial elongation to effectively prevent the thickness of elongated portions from becoming excessively small, this will make it possible to effectively suppress reduction in hiding power that might otherwise occur at elongated portions. As a result, this will make it possible to effectively suppress nonuniformities in concealability that might otherwise occur due to partial elongation. It is preferred that thickness of base film 81 be not greater than 150 μm, more preferred that this be not greater than 125 μm, still more preferred that this be not greater than 100 μm, and still more preferred that this be not greater than 75 μm.

It is preferred that thickness of base film 81 be greater than thickness of colored layer 82. Of course, thickness of base film 81 may be less than thickness of colored layer 82.

It is preferred that thickness of base film 81 be greater than thickness of hard coat layer 83. Of course, thickness of base film 81 may be less than thickness of hard coat layer 83.

Base film 81 comprises first layer 811, and second layer 812 which is laminated over first layer 811. First layer 811 is located between colored layer 82 and second layer 812. First layer 811 has the role of concealing the color of the substrate. Second layer 812 has the role of being in intimate contact with the substrate.

1.1.1.1. First Layer

It is preferred that thickness of first layer 811 be not less than 10 μm, more preferred that this be not less than 15 μm, and still more preferred that this be not less than 20 μm. By causing this to be not less than 10 μm, because it will be possible when first layer 811 undergoes partial elongation to effectively prevent the thickness of elongated portions from becoming excessively small, this will make it possible to effectively suppress reduction in hiding power that might otherwise occur at elongated portions. As a result, this will make it possible to effectively suppress nonuniformities in concealability that might otherwise occur due to partial elongation. It is preferred that thickness of first layer 811 be not greater than 150 μm, more preferred that this be not greater than 125 μm, still more preferred that this be not greater than 100 μm, and still more preferred that this be not greater than 75 μm. When this is not greater than 150 μm, because it will be possible to limit the volume of first layer 811 so that it does not become excessively large, this will make it possible to limit the amount of concealing material so that it does not become excessively large.

It is preferred that the ratio of the thickness of first layer 811 to the thickness of base film 81 (i.e., first layer 811 thickness/base film 81 thickness) be not less than 0.50, and more preferred that this be not less than 0.60. By causing this to be not less than 0.50, because it will be possible when first layer 811 undergoes partial elongation to effectively prevent the thickness of elongated portions from becoming excessively small, this will make it possible to effectively suppress reduction in hiding power that might otherwise occur at elongated portions. As a result, this will make it possible to effectively suppress nonuniformities in concealability that might otherwise occur due to partial elongation. It is preferred that this ratio be not greater than 0.95, and preferred that it be not greater than 0.90.

It is preferred that crystallinity of first layer 811 be not less than 20%, more preferred that this be not less than 25%, and still more preferred that this be not less than 30%. By causing this to be not less than 20%, because there will be a tendency for the slope of the stress-strain curve to increase monotonically with increasing strain, the fact that the portion thereof at which elongation begins to occur is such that elongation is less likely to occur means that it will be possible to suppress nonuniformity in the elongation of first layer 811. In addition, this will make it possible to reduce damage such as might otherwise be inflicted on first layer 811 by organic solvent(s) which may be used during formation of colored layer 82.

First layer 811 contains thermoplastic resin. This may be stated in another way by saying that first layer 811 comprises a composition containing thermoplastic resin. The fact that first layer 811 contains thermoplastic resin means that an external force may cause elongation of first layer 811.

As thermoplastic resin, polyester resin, polyolefin resin, polyamide resin, acrylic resin, polycarbonate resin, polyarylene sulfide resin, and so forth may be cited as examples. Of these, because they permit suppression of nonuniformity in the elongation of first layer 811, crystalline resins such as polyester resin, polyamide resin, and polyolefin resin are preferred. The reason for this is that it is the case with crystalline resins that because the fact that the slope of the stress-strain curve (more specifically, a stress-strain curve in which stress is plotted on the vertical axis, and strain is plotted on the horizontal axis) tends not to decrease with increasing strain means that there is a tendency for stress at the portion thereof at which elongation begins to occur to effectively increase, the portion thereof at which elongation begins to occur is such that elongation is less likely to occur. Of these, polyester resin is still more preferred. The reason for this is that it will permit it to withstand the heat of drying and so forth at the time that colored layer 82 is applied. Note that these may be modified as a result of copolymerization. Any one thereamong may be used, or any two or more thereamong may be used.

As polyester resin, polyethylene terephthalate resin, polyethylene naphthalate resin, copolymerized polyester resin, and so forth may be cited as examples. As copolymerized polyester resin, copolymerized polyethylene terephthalate resin, copolymerized polyethylene naphthalate resin, and so forth may be cited as examples. Of these, polyethylene terephthalate resin is preferred. Any one thereamong may be used, or any two or more thereamong may be used. Note that because description of copolymerized polyethylene terephthalate resin is given in connection with second layer 812, description thereof will be omitted here so as to avoid repetition.

Taking first layer 811 to be 100 mass % (i.e., taking the composition that makes up first layer 811 to be 100 mass %), it is preferred that thermoplastic resin content be not less than 70 mass %, more preferred that this be not less than 72 mass %, still more preferred that this be not less than 75 mass %, still more preferred that this be not less than 80 mass %, and still more preferred that this be not less than 85 mass %. When this is not less than 70 mass %, it will be possible to effectively impart stress thereto by means of stretching. Taking first layer 811 to be 100 mass %, it is preferred that thermoplastic resin content be not greater than 99 mass %, more preferred that this be not greater than 98 mass %, still more preferred that this be not greater than 97 mass %, and still more preferred that this be not greater than 96 mass %.

First layer 811 contains concealing material. This may be stated in another way by saying that first layer 811 comprises a composition containing concealing material. By causing first layer 811 to contain concealing material, because base film 81 will have hiding power, it will be able to conceal the color of the substrate (e.g., a metal plate for a car).

Taking first layer 811 to be 100 mass % (i.e., taking the composition that makes up first layer 811 to be 100 mass %), it is preferred that concealing material content be not less than 1 mass %, more preferred that this be not less than 2 mass %, still more preferred that this be not less than 3 mass %, and still more preferred that this be not less than 4 mass %. Causing this to be not less than 1 mass % will make it possible to increase the hiding power of base film 81. Taking first layer 811 to be 100 mass %, it is preferred that concealing material content be not greater than 30 mass %, more preferred that this be not greater than 28 mass %, still more preferred that this be not greater than 25 mass %, still more preferred that this be not greater than 20 mass %, and still more preferred that this be not greater than 15 mass %. When this is not greater than 30 mass %, it will be possible to effectively impart stress thereto by means of stretching.

It is preferred that refractive index of the concealing material be not less than 1.70. By causing this to be not less than 1.70, because this will make it possible to increase the amount of light that is reflected at the surface of the concealing material, it will make it possible to effectively impart base film 81 with hiding power. The refractive index of the concealing material might be not greater than 8.00, or it might be not greater than 6.00, or it might be not greater than 4.00, or it might be not greater than 3.00, for example. Here, refractive index refers to the absolute refractive index.

Whereas the concealing material may constitute particulate matter, it is preferred that particle diameter of the concealing material be not less than 0.10 μm, more preferred that this be not less than 0.15 μm, and still more preferred that this be not less than 0.20 μm. It is preferred that particle diameter of the concealing material be not greater than 30 μm, more preferred that this be not greater than 25 μm, still more preferred that this be not greater than 15 μm, still more preferred that this be not greater than 10 μm, and still more preferred that this be not greater than 3 μm.

As concealing material, metal powders such as aluminum powder, titanium oxide particles, metal oxides such as zinc oxide, and so forth may be cited as examples. These may be may be subjected to surface treatment. Of these, aluminum powder and titanium oxide particles are preferred. Any one thereamong may be used, or any two or more thereamong may be used.

As aluminum powder which is capable of being used as concealing material, aluminum flakes may be cited as an example. The aluminum flakes may be of the leafing type or they may be of the nonleafing type.

It is preferred that particle diameter of the aluminum powder be not less than 1 µm, more preferred that this be not less than 2 µm, still more preferred that this be not less than 5 µm, and still more preferred that this be not less than 10 µm. When this is not less than 1 µm, because it will be possible to prevent the fractional size of the space occupied by the aluminum powder per unit area from becoming excessively small, this will make it possible to increase hiding power. It is preferred that particle diameter of the aluminum powder be not greater than 30 µm, more preferred that this be not greater than 25 µm, still more preferred that this be not greater than 15 µm, still more preferred that this be not greater than 10 µm, and still more preferred that this be not greater than 3 µm. When this is not greater than 30 µm, because it will be possible to decrease the size of the gap between particles of aluminum powder, this will make it possible to increase hiding power.

Taking first layer 811 to be 100 mass % (i.e., taking the composition that makes up first layer 811 to be 100 mass %), it is preferred that aluminum powder content be not less than 1 mass %, more preferred that this be not less than 2 mass %, still more preferred that this be not less than 3 mass %, and still more preferred that this be not less than 4 mass %. When this is not less than 1 mass %, it will be possible to increase hiding power. Taking first layer 811 to be 100 mass %, it is preferred that aluminum powder content be not greater than 20 mass %, more preferred that this be not greater than 15 mass %, still more preferred that this be not greater than 12 mass %, and still more preferred that this be not greater than 10 mass %. When this is not greater than 20 mass %, it will be possible to effectively impart stress thereto by means of stretching.

As titanium oxide particles which are capable of being used as concealing material, anatase titanium, rutile titanium, and so forth may be cited as examples. Of these, rutile titanium is preferred because of its superior hiding power. Any one thereamong may be used, or any two or more thereamong may be used.

It is preferred that particle diameter of the titanium oxide particles be not less than 0.05 µm, more preferred that this be not less than 0.10 µm, and still more preferred that this be not less than 0.15 µm. When this is not less than 0.05 µm, because it will be possible to prevent the fractional size of the space occupied by the titanium oxide particles per unit area from becoming excessively small, this will make it possible to increase hiding power. It is preferred that particle diameter of the titanium oxide particles be not greater than 10 µm, more preferred that this be not greater than 5 µm, and still more preferred that this be not greater than 3 µm. When this is not greater than 10 µm, because it will be possible to decrease the size of the gap between titanium oxide particles, this will make it possible to increase hiding power.

Taking first layer 811 to be 100 mass % (i.e., taking the composition that makes up first layer 811 to be 100 mass %), it is preferred that titanium oxide particle content be not less than 1 mass %, more preferred that this be not less than 3 mass %, still more preferred that this be not less than 5 mass %, and still more preferred that this be not less than 7 mass %. When this is not less than 1 mass %, it will be possible to increase hiding power. Taking first layer 811 to be 100 mass %, it is preferred that titanium oxide particle content be not greater than 40 mass %, more preferred that this be not greater than 30 mass %, and still more preferred that this be not greater than 25 mass %. When this is not greater than 40 mass %, it will be possible to effectively impart stress thereto by means of stretching.

First layer 811 may contain other additive(s). As additives, dyes, fluorescent brighteners, antioxidants, thermal stabilizers, ultraviolet light absorbers, antistatic agents, and so forth may be cited as examples.

1.1.1.2. Second Layer

It is preferred that thickness of second layer 812 be not less than 1 µm, and more preferred that this be not less than 3 µm. When this is not less than 1 µm, because it will be possible to smooth out the surface roughness (i.e., surface irregularities) of the substrate, this will be excellent in terms of ability to make intimate contact with the substrate. It is preferred that thickness of second layer 812 be not greater than 30 µm, and more preferred that this be not greater than 20 µm.

Second layer 812 contains thermoplastic resin. This may be stated in another way by saying that second layer 812 comprises a composition containing thermoplastic resin. Due to the fact that second layer 812 contains thermoplastic resin, paint substitute film 8 can be made to fuse to the substrate.

As thermoplastic resin, polyester resin, polyolefin resin, polyamide resin, acrylic resin, polycarbonate resin, polyarylene sulfide resin, and so forth may be cited as examples. Of these, crystalline resins such as polyester resin, polyamide resin, and polyolefin resin are preferred, and polyester resin is still more preferred. Note that these may be modified as a result of copolymerization. Any one thereamong may be used, or any two or more thereamong may be used.

As polyester resin, polyethylene terephthalate resin, polyethylene naphthalate resin, copolymerized polyester resin, and so forth may be cited as examples. As copolymerized polyester resin, copolymerized polyethylene terephthalate resin, copolymerized polyethylene naphthalate resin, and so forth may be cited as examples. Of these, copolymerized polyethylene terephthalate resin is preferred. Any one thereamong may be used, or any two or more thereamong may be used.

Copolymerized polyethylene terephthalate resin contains units made up of ethylene terephthalate (hereinafter "ethylene terephthalate units"). It is preferred that ethylene terephthalate units be not less than 70 mol % of all repeating units, and more preferred that this be not less than 75 mol % thereof. Ethylene terephthalate units might be not greater than 98 mol % of all repeating units, or might be not greater than 95 mol % thereof, or might be not greater than 90 mol % thereof.

As copolymer components—and especially as dicarboxylic acids—for obtaining copolymerized polyethylene terephthalate resin, isophthalic acid, 2,6-naphthalenedicarboxylic acid, 2,7-naphthalenedicarboxylic acid, and other such aromatic carboxylic acids; adipic acid, azelaic acid, sebacic acid, decanedicarboxylic acid, and other such aliphatic dicarboxylic acids; cyclohexanedicarboxylic acid and other such alicyclic dicarboxylic acids, and so forth may be cited as examples. Of these, isophthalic acid is preferred. Any one thereamong may be used, or any two or more thereamong may be used. As copolymer components—and especially as diols—for obtaining copolymerized polyethylene terephthalate resin, butanediol, hexanediol, and other such aliphatic diols; cyclohexanedimethanol and other such alicyclic diols, and so forth may be cited as examples. Any one thereamong may be used, or any two or more thereamong may be used.

Taking second layer 812 to be 100 mass % (i.e., taking the composition that makes up second layer 812 to be 100 mass %), it is preferred that thermoplastic resin content be not less than 80 mass %, more preferred that this be not less than 90 mass %, and still more preferred that this be not less than 95 mass %. When this is not less than 80 mass %, it will be possible to cause paint substitute film 8 to satisfactorily fuse to the substrate.

Second layer 812 might contain concealing material, or it might not contain concealing material. As concealing material, the concealing materials described in connection with first layer 811 may be given as examples. Where second layer 812 contains concealing material, taking second layer 812 to be 100 mass % (i.e., taking the composition that makes up second layer 812 to be 100 mass %), it is preferred that concealing material content be not less than 20 mass %, more preferred that this be not less than 10 mass %, and still more preferred that this be not less than 5 mass %. When this is not less than 20 mass %, it will be possible to cause paint substitute film 8 to satisfactorily fuse to the substrate.

Second layer 812 may contain other additive(s). As additives, dyes, fluorescent brighteners, antioxidants, thermal stabilizers, ultraviolet light absorbers, antistatic agents, and so forth may be cited as examples. Any one thereamong may be used, or any two or more thereamong may be used.

1.1.1.3. Base Film Fabrication Method

Base film 81 might for example be fabricated by a procedure in which raw materials for forming first layer 811 are supplied to a first extruder, and raw materials for forming second layer 812 are supplied to a second extruder, following which molding material is guided from the first extruder to a feedblock, and molding material is guided from the second extruder to the feedblock, these molding materials are laminated at the feedblock, a sheet is then melt extruded from a die, and this sheet is then made to undergo solidification by means of a cooling roller, and where necessary is subjected to biaxial stretching. Biaxial stretching will make it possible to increase crystallinity. Biaxial stretching may be sequential biaxial stretching or may be simultaneous machine- and transverse-direction biaxial stretching. Of these, sequential biaxial stretching is preferred. During sequential biaxial stretching, it is for example preferred that, after having passed through the cooling roller, the sheet be stretched in the vertical direction, i.e., machine direction (hereinafter "MD"), and, after having been stretched in the MD direction, the sheet be stretched in the horizontal direction, i.e., transverse direction (hereinafter "TD"). The MD direction stretching temperature, MD direction stretching ratio, TD direction stretching temperature, and TD direction stretching ratio may be chosen as appropriate. It is preferred that the product of the MD direction stretching ratio and the TD direction stretching ratio (hereinafter "planar multiple") be 9.0× to 20×. Note that where necessary the sheet may be subjected to processing such as surface treatment between the first stretching (e.g., stretching in MD direction) and the second stretching (e.g., stretching in TD direction).

Regarding methods other than this, base film 81 might for example be fabricated by a procedure in which raw materials for forming first layer 811 are supplied to an extruder, a sheet is melt extruded from a die, this sheet is then made to undergo solidification by means of a cooling roller, and where necessary is subjected to biaxial stretching to fabricate first layer 811, and second layer 812 is formed by coating this over first layer 811.

1.1.2. Colored Layer

Colored layer 82 has the role of decorating the substrate. It is preferred that colored layer 82 contain binder and at least one of either pigment or dye. Due to the fact that colored layer 82 contains binder, it will be possible to prevent occurrence of cracking at colored layer 82 when paint substitute film 8 is subject to elongation. It is preferred that the binder possess transparency. As binder, acrylic resin, urethane resin, polyester resin, PVDF (polyvinylidene fluoride), and so forth may be cited as examples. Of these, acrylic resin is preferred. Any one thereamong may be used, or any two or more thereamong may be used.

Furthermore, these resins may be copolymerized. As pigments and dyes, carbon black (sumi), black iron oxide, titanium white, antimony white, chrome yellow, titanium yellow, red iron oxide, cadmium red, ultramarine, cobalt blue, quinacridone red, isoindolinone yellow, phthalocyanine blue, aluminum, brass, titanium dioxide, pearlescent pigment, and so forth may be cited as examples. Any one thereamong may be used, or any two or more thereamong may be used. Other colorant(s) and/or additive(s) may also be employed for color mixing purposes.

It is preferred that thickness of colored layer 82 be not less than 2 µm, more preferred that this be not less than 5 µm, and still more preferred that this be not less than 10 µm. It is preferred that thickness of colored layer 82 be not greater than 100 µm, more preferred that this be not greater than 75 µm, still more preferred that this be not greater than 50 µm, still more preferred that this be not greater than 45 µm, and still more preferred that this be not greater than 30 µm. Note that colored layer 82 might be a single-layer structure, or it might be a multilayer structure.

Colored layer 82 may be formed over first layer 811 of base film 81 by any desired method. For example, colored layer 82 may be formed as a result of coating, melt extrusion, lamination, and/or the like. Of these, coating is preferred because it will allow colored layer 82 to be easily formed.

1.1.3. Hard Coat Layer

Hard coat layer 83 has the role of protecting colored layer 82. The hardness of hard coat layer 83 may be greater than the hardness of colored layer 82. It is preferred that hard coat layer 83 possess transparency.

It is preferred that hard coat layer 83 be curable, and more preferred that it be thermosettable. It is preferred that the cured state of hard coat layer 83 be such that it is semicured; i.e., that it be B-stage. Because this will make it possible for external forces to cause deformation of hard coat layer 83, it will make it possible for paint substitute film 8 to be made to follow the shape of the substrate and/or deformations in the shape of the substrate, and because it will allow it to be made capable of being cured at a later time, it will make it possible by carrying out curing thereof to effectively protect colored layer 82.

Hard coat layer 83 might, for example, contain resin(s) and crosslinking agent(s). As resin, acrylic resin, melamine resin, urethane resin, and so forth may be cited as examples. One or more species of these resins may be used, and they may be copolymerized. Crosslinking agent(s) may be chosen as appropriate and used. Hard coat layer 83 may contain other additive(s).

It is preferred that thickness of hard coat layer 83 be not less than 5 µm, more preferred that this be not less than 10 µm, and still more preferred that this be not less than 15 µm. When this is not less than 5 µm, it will be possible to effectively prevent damage to colored layer 82, base film 81, and the substrate. It is preferred that thickness of hard coat layer 83 be not greater than 100 µm, more preferred that this be not greater than 75 µm, still more preferred that this be not greater than 60 µm, still more preferred that this be not greater than 50 µm, and still more preferred that this be not greater than 40 µm. The reason for this is that the smaller the thickness of hard coat layer 83 the more economical this will be. Moreover, since larger thicknesses will make it possible to produce deeper colors, it is preferred that the thickness thereof be adjusted as appropriate. Note that hard coat layer 83 might be a single-layer structure, or it might be a multilayer structure.

Hard coat layer 83 may be formed over colored layer 82 by any desired method. For example, hard coat layer 83 may be formed as a result of coating, melt extrusion, lamination, and/or the like. Coating is preferred because it will allow hard coat layer 83 to be easily formed. Note that when two coats of coating(s) are to be applied to form a hard coat layer 83 having a two-layer structure, drying conditions may be made different at the first coat versus the second coat so as to adjust the degree to which each of the respective layers is cured.

1.2. Protective Film

Whereas it is expected that it will be made to delaminate from paint substitute film 8, until it is delaminated therefrom protective film 9 may have the role of protecting hard coat layer 83. In other words, protective film 9 has the role of protecting hard coat layer 83 from scratches. Note that it is preferred that protective film 9 possess transparency.

It is preferred that thickness of protective film 9 be not less than 10 µm, more preferred that this be not less than 25 µm, and still more preferred that this be not less than 38 µm. Causing this to be not less than 10 µm will permit attainment of excellent rigidity. It is preferred that thickness of protective film 9 be not greater than 150 µm, more preferred that this be not greater than 100 µm, still more preferred that this be not greater than 75 µm, and still more preferred that this be not greater than 50 µm. The reason for this is that the smaller the thickness of protective film 9 the more economical this will be. Note that protective film 9 might be a single-layer structure, or it might be a multilayer structure.

It is preferred that surface roughness of at least that face which of the two faces of protective film 9 is in contact with hard coat layer 83 be not less than 1 nm, more preferred that this be not less than 3 nm, and still more preferred that this be not less than 10 nm. When this is not less than 10 µm, because the transport characteristics of protective film 9 will be satisfactory, the handling characteristics thereof will be satisfactory. It is preferred that surface roughness thereof be not greater than 1000 nm, more preferred that this be not greater than 800 nm, and still more preferred that this be not greater than 500 nm. Whereas it is possible that the surface profile of protective film 9 will be offset onto hard coat layer 83, when surface roughness is not greater than 1000 nm, it will be possible to prevent this from adversely affecting the external appearance of hard coat layer 83.

It is preferred that at least that face which of the two faces of protective film 9 is in contact with hard coat layer 83 be made to undergo release treatment. During release treatment, silicone-type release agent, fluorinated-type release agent, and/or long-chain aliphatic-type release agent might, for example, be employed. Of these, because it is inexpensive, silicone-type release agent is preferred.

Protective film 9 may contain thermoplastic resin. As thermoplastic resin, it is preferred that this be such that the temperature at which the ratio of the loss modulus to the storage modulus (i.e., tan δ) as obtained by measurement of dynamic viscoelasticity exhibits a primary peak is not less than 80° C. When this is not less than 80° C., because heat resistance will be satisfactory, there will be little tendency for strain to be produced by tension acting on composite film 7 during transport of composite film 7, and so this will make it possible to prevent a situation in which strain might otherwise cause the surface of hard coat layer 83 to become rough. There is no particular choice regarding the upper limit of the range in values for the temperature at which a primary peak is exhibited thereby. Because the heat resistance thereof is satisfactory and because there will be less tendency for wrinkles to form during lamination of protective film 9, it is preferred that the thermoplastic resin be polyester resin. As polyester resin, the polyester resins described in connection with first layer 811 may be given as examples. Note that where polyester resin is employed at first layer 811 it is preferred that polyester resin also be employed at protective film 9.

Protective film 9 may be formed over hard coat layer 83 of paint substitute film 8 by any desired method. For example, protective film 9 may be formed as a result of coating, melt extrusion, lamination, and/or the like. Of these, because it is easy, lamination is preferred.

2. Laminated Metal Plate, Processed Article, and Molded Article

Figure 2:
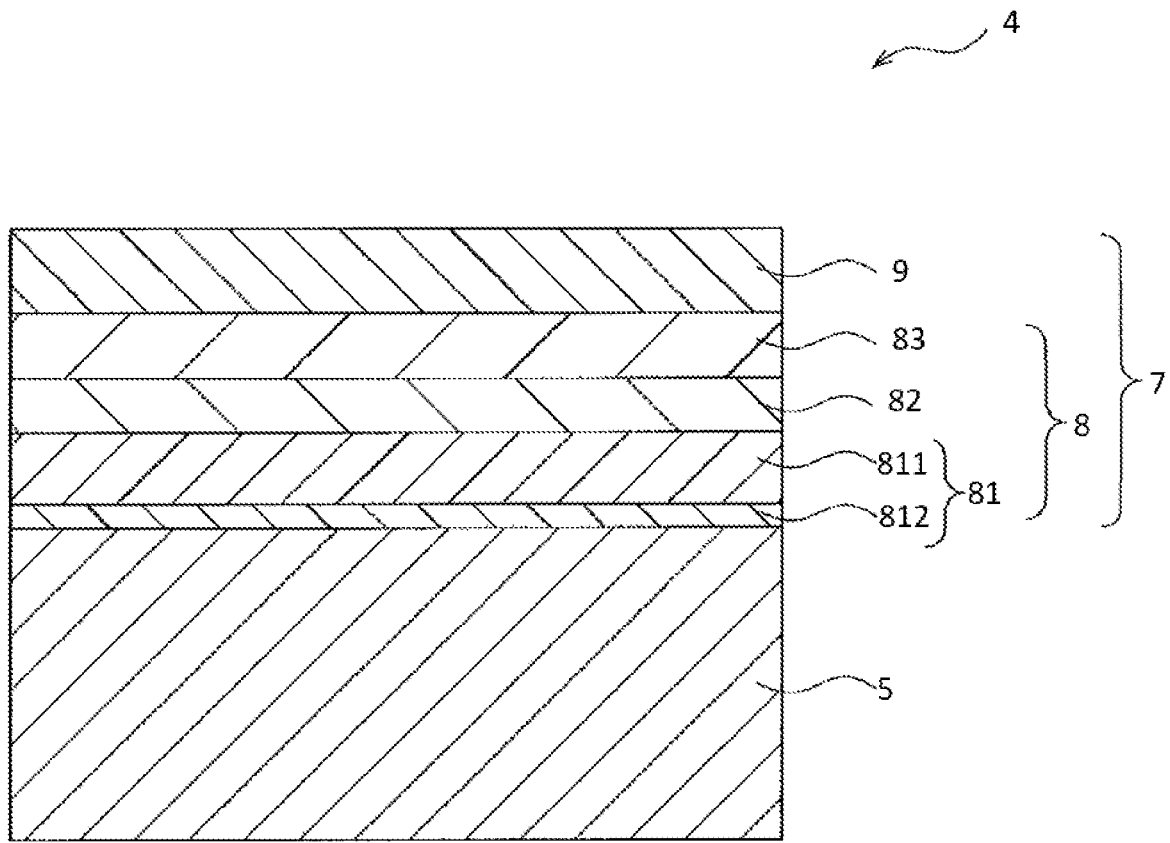
FIG. 2 Schematic sectional diagram of a laminated metal plate in accordance with the present embodiment.

As shown in FIG. 2, laminated metal plate 4 comprises metal plate 5 and composite film 7 which is laminated to metal plate 5. As metal plate 5, steel plate, aluminum alloy plate, magnesium alloy plate, and other such alloy plates may be cited as an examples. Of these, steel plate is preferred. These may be may be subjected to pretreatment such as zinc alloy plating. Note that whereas this drawing shows a situation in which composite film 7 is provided at one of the two faces of metal plate 5, composite film 7 may be provided at each of the two faces of metal plate 5.

Laminated metal plate 4 may be obtained, for example, by heating metal plate 5 and causing composite film 7 to be thermocompressively bonded thereto such that base film 81 (more specifically, second layer 812 of base film 81) which makes up composite film 7 comes in contact therewith, and carrying out cooling thereof. This may be carried out in roll-to-roll fashion. Note that paint substitute film 8 may instead of composite film 7 be thermocompressively bonded to metal plate 5.

Laminated metal plate 4 may be press molded into the desired shape (e.g., the shape of a fender, the shape of a hood, etc.) to obtain a processed article. Following press molding, note that hard coat layer 83 may be cured to C-stage. The processed article obtained in this fashion may be a member for a car; for example, an interior member, exterior member, or the like. Of these, an exterior member for a car is preferred. As the car, note that automobiles, railroad cars, airplanes, and so forth may be cited as examples. Of these, automobiles are preferred. Where the processed article will be used in a car such as an automobile, the processed article may be provided with a metal member for a car and with composite film 7 and/or paint substitute film 8 disposed on at least a portion of the surface of the metal member.

On the other hand, a molded article is provided with a resin member for a car and with paint substitute film 8 in intimate contact with at least a portion of the surface of the resin member. The resin member may contain thermoplastic resin. This may be stated in another way by saying that the resin member comprises a resin composition containing thermoplastic resin. As thermoplastic resin, polyolefin resin, polyamide resin, polycarbonate resin, polyphenylene sulfide resin, and so forth may be cited as examples. Of these, polyolefin resin is preferred. Any one thereamong may be used, or any two or more thereamong may be used. The resin composition may contain reinforcing fiber. The resin composition may contain additive(s).

A molded article might, for example, be fabricated by inserting paint substitute film 8 into the cavity of a die, and causing the resin composition to be fed into the cavity. In other words, in-mold molding may be used to fabricate the molded article. Here, paint substitute film 8 is inserted into the die in such fashion as to permit base film 81 (more specifically, second layer 812 of base film 81) which makes up paint substitute film 8 to come in contact with the resin composition. During in-mold molding, curing of hard coat layer 83 may be carried out between insertion of paint substitute film 8 and feeding of the resin composition thereinto, or curing of hard coat layer 83 may be carried out between feeding of the resin composition thereinto and opening of the die. Note that composite film 7 may instead of paint substitute film 8 be inserted into the die.

The molded article obtained in this fashion may be a member for a car; for example, an interior member, exterior member, or the like. Of these, an exterior member for a car is preferred. As the car, note that automobiles, railroad cars, airplanes, and so forth may be cited as examples. Of these, automobiles are preferred.

3. Various Modifications May Be Made to the Foregoing Embodiment

Various modifications may be made to the foregoing embodiment. For example, modifications which may be made to the foregoing embodiment might include any one or more variations chosen from among the following.

The foregoing embodiment was described in terms of a constitution in which first layer 811 has the role of concealing the substrate, and second layer 812 has the role of being in intimate contact with the substrate. However, the foregoing embodiment is not limited to this constitution. For example, it is also possible to adopt a constitution in which second layer 812 has both the role of concealing the substrate and the role of being in intimate contact with the substrate. Where this is the case, note that it will be preferred that first layer 811 have transparency.

The foregoing embodiment was described in terms of a constitution in which base film 81 is provided with first layer 811 and second layer 812. However, the foregoing embodiment is not limited to this constitution. For example, it is also possible to adopt a constitution in which base film 81 is a single-layer structure. Description of base film 81 in such case will be omitted, as it would be redundant in light of the description given above with respect to first layer 811. The description given above with respect to first layer 811 may be treated as description of a base film 81 that has a single-layer structure. On the other hand, it is also possible to adopt a constitution in which base film 81 includes a third layer (not shown) between first layer 811 and second layer 812. The third layer may contain thermoplastic resin. As thermoplastic resin, the thermoplastic resins described in connection with first layer 811 may be given as examples. The third layer may contain concealing material, and it may contain other additive(s) and/or the like.

The foregoing embodiment was described in terms of a constitution in which base film 81 caused there to be adhesion between the substrate and colored layer 82. However, the foregoing embodiment is not limited to this constitution. For example, it is also possible to adopt a constitution in which—referring to the two faces of base film 81 in terms of a face (hereinafter "first face") at which colored layer 82 is disposed and a face (hereinafter "second face") opposite the first face—an adhesive layer comprising adhesive is laminated to the second face. Thus, an adhesive layer, base film 81, colored layer 82, and hard coat layer 83 may be laminated in this order. In other words, paint substitute film 8 may have an adhesive layer. Note that a separator may be provided over the adhesive layer.

The foregoing embodiment was described in terms of a constitution in which composite film 7 or paint substitute film 8 is thermocompressively bonded to metal plate 5. However, the foregoing embodiment is not limited to this constitution. For example, metal plate 5 may be press molded into the desired shape (e.g., the shape of a fender, the shape of a hood, etc.), and composite film 7 or paint substitute film 8 may be thermocompressively bonded to this.

The foregoing embodiment was described in terms of a constitution in which in-mold molding is used to fabricate a molded article. However, the foregoing embodiment is not limited to this constitution. For example, it is also possible to adopt a constitution in which a resin member is molded, and composite film 7 or paint substitute film 8 is thermocompressively bonded to the resin member to fabricate a molded article.

The foregoing embodiment was described in terms of a constitution in which composite film 7 and/or paint substitute film 8 is used to fabricate laminated metal plate 4, a processed article, and/or a molded article. However, the foregoing embodiment is not limited to this constitution.

WORKING EXAMPLES

Although the present invention is described in detail below in terms of working examples, it should be understood that the present invention is not limited to only these working examples. Moreover, except where otherwise stated, the parts and percents appearing in the working examples respectively indicate parts by mass and percents by mass.

Methods for Measuring Various Properties (1) Thickness

A dot-type film thickness measuring device (Micrometer; manufactured by Mitutoyo Corporation) was used to measure thickness of base film at 10 measurement points at intervals of 50 mm in the transverse direction of the base film. The average value thereof is indicated as base film thickness at TABLE 1. After the colored layer was provided at the base film, a similar method was employed to measure the combined thickness of the base film and the colored layer, the thickness of the base film being subtracted from the combined thickness to determine the thickness of the colored layer. After the hard coat layer was provided at the colored layer, a similar method was employed to measure the combined thickness of the base film, colored layer, and hard coat layer, the thickness of the colored layer and the thickness of the base film being subtracted from the combined thickness to determine the thickness of the hard coat layer.

(2) Average Transmittance (Average Value of Total Luminous Transmittance from Wavelength 400 nm to 700 nm)

A spectrophotometer (UV-3101 PC manufactured by Shimadzu Corporation) was used to measure transmittance at visible wavelengths of light transmitted by a sample (more specifically, a sample cut from the base film) in accordance with the integrating sphere method. An average value was calculated from the results of measurement of total luminous transmittance from wavelength 400 nm to wavelength 700 nm. This is indicated as average transmittance at TABLE 1.

(3) Average Reflectance (Average Value of Total Luminous Reflectance from Wavelength 400 nm to 700 nm)

A spectrophotometer (UV-3101PC manufactured by Shimadzu Corporation) was used to measure total luminous reflectance at visible wavelengths of light reflected by a sample (more specifically, a sample cut from the base film).

The light-receiving unit at this time was 8°. An average value was calculated from the results of measurement of total luminous reflectance from wavelength 400 nm to wavelength 700 nm. This is indicated as average reflectance at TABLE 1.

(4) Scattering Coefficient

The Kubelka-Munk scattering coefficient S was calculated in accordance with Formula (1), below, as an index of hiding power due to the scattering effect.

$$S=\{(1-T)/T\}/d \qquad (1)$$

Here, T indicates average transmittance (i.e., the average value of the total luminous transmittance from wavelength 400 nm to 700 nm) of a sample (more specifically, a sample cut from the base film) and is expressed in %. d indicates the thickness of the sample and is expressed in μm. Thus, the scattering coefficient S is calculated as a value having dimensions of $\mu m^{-1}$.

(5) Contrast Ratio

Roll lamination was used to compressively bond base film at 100° C. to fractional hiding power test paper (Vertical Black-and-White A-Type manufactured by TP Giken) that was in accordance with JIS K 5600 and that had a black portion and a white portion to obtain fractional hiding power test paper to which base film was attached. Samples were cut from the black portion and the white portion of the fractional hiding power test paper to which the base film was attached, and average reflectances (i.e., average values of total luminous reflectance from wavelength 400 nm to 700 nm) of these samples were measured in accordance with the aforementioned method. The average reflectance of the sample cut from the black portion is indicated as RB at TABLE 1, and the average reflectance of the sample cut from the white portion is indicated as RW thereat. Contrast ratio was calculated as RB divided by RW; i.e., in accordance with Formula (2), below. Note that while the base film and the fractional hiding power test paper were not firmly in intimate contact, it is fair to say that the intimate contact therebetween was adequate.

$$\text{Contrast ratio}=RB/RW \qquad (2)$$

Working Examples 1 Through 5 and Comparative Example 3

(1) Fabrication of Paint Substitute Film

To fabricate paint substitute film, base film was first prepared. To form the first layer of the base film, polyethylene terephthalate resin (PET) comprising dicarboxylic acid component in the form of terephthalic acid and glycol component in the form of ethylene glycol, and concealing material were employed in accordance with TABLE 1. To form the second layer of the base film, copolymerized polyethylene terephthalate resin (copolymerized PET) comprising dicarboxylic acid component in the form of terephthalic acid and isophthalic acid and glycol component in the form of ethylene glycol was employed in accordance with TABLE 1.

Following drying for 4 hours at 160° C., the polyethylene terephtalate resin and the concealing material were supplied to a first extruder; furthermore, following drying for 4 hours at 160° C., the copolymerized polyethylene terephthalate resin was supplied to a second extruder. Molding material was guided from the first extruder to a feedblock, molding material was guided from the second extruder to the feedblock, and these molding materials were laminated at the feedblock and were melt extruded from a die. The sheet which emerged from the die was glassified by means of a cooling roller, was made to undergo stretching in the machine direction at 90° C., was subjected to surface coating wherein acrylic resin was applied to both faces using a reversing roll coater, was thereafter made to undergo stretching in the transverse direction at 100° C., and was rolled up into a rolled state. A base film which was provided with a first layer containing polyethylene terephthalate resin and concealing material, and a second layer containing copolymerized polyethylene terephthalate resin, and which was stretched to a planar multiple of 11×, was thus obtained.

The base film was unfurled and was fed to a comma coater at which a colored layer was applied over the first layer of the base film. To form the colored layer, a solvent coating containing acrylic urethane-type resin and 10 mass % of aluminum pigment as well as 35 mass % in nonvolatile components was employed. This was applied so as to obtain a colored layer of thickness 20 μm, and this was dried in a drying oven at 90° C., and was thereafter rolled up.

The roll of material thus obtained (i.e., the roll of material in which the colored layer was present) was unfurled and was fed to a comma coater at which a hard coat coating, described below, was applied over the colored layer so as to obtain a hard coat layer of thickness 30 μm, and this was adequately dried in a drying oven at 90° C.

As a result of such procedure, a paint substitute film was obtained. The hard coat layer making up the paint substitute film was in a semicured state.

(2) Fabrication of Composite Film

A separator (biaxially stretched polyethylene terephthalate resin film that had been subjected to release treatment) was laminated over the hard coat layer making up the paint substitute film, and this was rolled up into a rolled state to obtain a composite film as shown in FIG. 1.

(3) Hard Coat Coating 150 parts by mass of methyl isobutyl ketone were placed in a four-necked flask equipped with a cooling tube, agitation device, thermometer, and nitrogen feed tube, and the temperature of this was increased while causing agitation thereof in a nitrogen atmosphere. When the temperature within the flask reached 74° C., this was maintained as the synthesizing temperature, and a monomer solution in which 3 parts by mass of methyl methacrylate, 82.54 parts by mass of n-butyl methacrylate, 12.85 parts by mass of 4-hydroxybutyl acrylate, 0.61 part by mass of methacrylic acid, 1 part by mass of Fancryl FA-711 MM (pentamethyl piperidinyl methacrylate; manufactured by Hitachi Chemical Company, Ltd.), and 0.1 part by mass of azobisisobutyronitrile were mixed was dripped into the flask over the course of 2 hours. At one-hour intervals starting from one hour following the conclusion of the monomer drip, 0.02 part by mass of azobisisobutyronitrile was added at each interval to cause the reaction to continue, the reaction being allowed to continue until the amount of unreacted monomer within the monomer solution was 1% or less. When the amount of unreacted monomer therein was 1% or less, this was cooled to stop the reaction and to obtain acrylic copolymer solution having approximately 40 mass % solids content. 59.9 parts by mass (solids content mass) of polyisocyanate compound in the form of Duranate "P301-75E" (a polyisocyanate of hexamethylene diisocyanate; manufactured by Asahi Kasei Chemicals Corporation) was added to this acrylic copolymer solution, methyl isobutyl ketone was further added in an amount sufficient to cause solids content to be 30 mass %, and this was agitated to obtain hard coat coating.

(4) Concealing Material

| | |
|---|---|
| Aluminum powder | PCF7130 manufactured by Toyo Aluminium K.K. |
| Titanium oxide particles | R42 manufactured by Sakai Chemical Industry Co Ltd. |
| Calcium carbonate | Kalfain200 manufactured by Maruo Calcium Co., Ltd. |

Comparative Example 1

Except for the fact that concealing material was not used, a base film was fabricated using a protocol identical to that at Working Example 3. Except for the fact that aluminum pigment was not used, a colored layer was formed using a protocol identical to that at Working Example 3. A composite film was fabricated using a protocol that was in other respects identical to that at Working Example 3.

Comparative Example 2

Except for the fact that an aluminum coat layer was formed over the first layer making up the base film, a composite film was fabricated using a protocol identical to that at Working Example 3. At this composite film, a base film, an aluminum coat layer, a colored layer, and a hard coat layer were laminated in this order. Note that the aluminum coat layer did not contain binder.

Supplemental Explanation Regarding TABLE 1

At TABLE 1, "copolymerized amount" indicates the amount of units made up of isophthalic acid and ethylene glycol when all repeating units of the copolymerized polyethylene terephthalate resin are taken to be 100 mol %.

At TABLE 1, "substrate with attached base film" indicates that which was fabricated by causing the base film to be thermocompressively bonded to the substrate in such fashion as to cause the second layer of the base film to come in contact with the substrate (fractional hiding power test paper or zinc-plated steel plate). Note that it was only at Comparative Example 2 that the substrate with attached base film had the aluminum coat.

At TABLE 1, "substrate with attached base film at 20% elongation" indicates that which was fabricated by causing the base film to undergo an elongation of 20% and thereafter causing the base film to be thermocompressively bonded to the substrate so as to cause the second layer of the base film to come in contact with the substrate (fractional hiding power test paper or zinc-plated steel plate) and so as to cause the 20% elongation to be maintained. Note that it was only at Comparative Example 2 that the substrate with attached base film at 20% elongation had the aluminum coat.

At TABLE 1, "difference between average reflectances" indicates the absolute value of the difference between the average reflectance (i.e., the average value of the total luminous reflectance from wavelength 400 nm to 700 nm) measured when in the base-film state and the average reflectance measured when in the substrate-with-attached-base-film state.

TABLE 1

| | | | | Working Example 1 | Working Example 2 | Working Example 3 | Working Example 4 |
|---|---|---|---|---|---|---|---|
| Paint substitute film | Hard coat layer | Resin | Type | Acrylic resin | Acrylic resin | Acrylic resin | Acrylic resin |
| | | Thickness | μm | 30 | 30 | 30 | 30 |
| | Colored layer | Resin | Type | Acrylic resin | Acrylic resin | Acrylic resin | Acrylic resin |
| | | Thickness | μm | 20 | 20 | 20 | 20 |
| | | Pigment | Type | Aluminum | Aluminum | Aluminum | Aluminum |
| | Base film | Resin | Type | PET/copolymerized PET | PET/copolymerized PET | PET/copolymerized PET | PET/copolymerized PET |
| | | Copolymerized amount | mol | 14 | 14 | 14 | 20 |
| | | Base film thickness | μm | 38 | 38 | 50 | 50 |
| | | First layer thickness | μm | 30 | 30 | 40 | 40 |
| | | Second layer thickness | μm | 8 | 8 | 10 | 10 |
| | | Concealing material | Type | Aluminum powder | Aluminum powder | Titanium oxide | Titanium oxide |
| | | Concealing material concentration | Mass % | 5 | 7 | 20 | 20 |
| | | Concealing maternal particle diameter | μm | 20 | 20 | 0.3 | 0.3 |
| | | Concealing material refractive index | — | 1.76 | 1.76 | 2.67 | 2.67 |
| | | Average transmittance | % | 12 | 9 | 7 | 6 |
| | | Difference between reflectances (maximum − minimum) | % | 1 | 0 | 7 | 7 |
| | | Average reflectance: R | % | 52 | 53 | 88 | 88 |
| | | Scattering coefficient: S | μm$^{-1}$ | 0.244 | 0.337 | 0.348 | 0.392 |
| Substrate with attached base film | Substrate: Acrylic resin (black) | Average reflectance of substrate with attached base film: RB | % | 52 | 53 | 82 | 81 |
| | | Difference between average reflectances |ΔR| | % | 0 | 0 | 6 | 7 |

TABLE 1-continued

|  |  |  |  |  |  |  |  |
|---|---|---|---|---|---|---|---|
|  | Substrate: Acrylic resin (white) | Average reflectance of substrate with attached base film: RW | % | 56 | 56 | 89 | 88 |
|  |  | Difference between average reflectances \|ΔR\| | % | 4 | 3 | 1 | 0 |
|  | Contrast ratio | RB/RW | — | 0.94 | 0.95 | 0.92 | 0.92 |
|  | Substrate: Zinc-plated steel plate | Average reflectance of substrate with attached base film: R | % | 53 | 53 | 84 | 83 |
|  |  | Difference between average reflectances \|ΔR\| | % | 1 | 0 | 4 | 5 |
| Base film when at 20% elongation |  | Average transmittance at 20% | % | 14 | 12 | 6 | 7 |
|  |  | Difference between transmittances at 20% (maximum − minimum) | % | 0 | 0 | 7 | 7 |
|  |  | Average transmittance at 20% − initial average transmittance | % | 2 | 3 | 0 | 1 |
|  |  | Average reflectance at 20% | % | 52 | 52 | 85 | 85 |
|  |  | Visual defects | — | No problem | No problem | No problem | No problem |
| Substrate with attached base film at 20% elongation | Substrate: Acrylic resin (black) | Average reflectance of substrate with attached base film at 20% elongation: RB20 | % | 52 | 53 | 82 | 81 |
|  |  | Difference between average reflectances \|ΔR\| | % | 0 | 1 | 3 | 4 |
|  | Substrate: Acrylic resin (white) | Average reflectance of substrate with attached base film at 20% elongation: RW20 | % | 56 | 55 | 88 | 87 |
|  |  | Difference between average reflectances \|ΔR\| | % | 4 | 3 | 3 | 2 |
|  | Contrast ratio | RB20/RW20 | — | 0.94 | 0.96 | 0.92 | 0.93 |
|  | Substrate: Zinc-plated steel plate | Average reflectance of substrate with attached base film at 20% elongation: R | % | 52 | 52 | 82 | 82 |
|  |  | Difference between average reflectances \|ΔR\| | % | 0 | 0 | 30 | 3 |

|  |  |  |  | Working Example 5 | Comparative Example 1 | Comparative Example 2 | Comparative Example 3 |
|---|---|---|---|---|---|---|---|
| Paint Substitute film | Hard coat layer | Resin |  | Acrylic resin | Acrylic resin | Acrylic resin | Acrylic resin |
|  |  | Thickness |  | 30 | 30 | 30 | 30 |
|  | Colored layer | Resin |  | Acrylic resin | Acrylic resin | Acrylic resin | Acrylic resin |
|  |  | Thickness |  | 20 | 20 | 20 | 20 |
|  |  | Pigment |  | Aluminum | — | Aluminum | Aluminum |
|  | Base film | Resin |  | PET/ copolymerized PET | PET/ copolymerized PET | PET/ copolymerized PET * Aluminum coat | PET/ copolymerized PET |
|  |  | Copolymerized amount |  | 14 | 14 | 14 | 14 |
|  |  | Base film thickness |  | 25 | 50 | 50 | 38 |
|  |  | First layer thickness |  | 20 | 40 | 40 | 30 |
|  |  | Second layer thickness |  | 5 | 10 | 10 | 8 |
|  |  | Concealing material |  | Titanium oxide | — | — | Calcium carbonate |
|  |  | Concealing material concentration |  | 10 | — | — | 5 |
|  |  | Concealing maternal particle diameter |  | 0.3 | — | — | 0.08 |

TABLE 1-continued

| | | | | | | |
|---|---|---|---|---|---|---|
| | | Concealing material refractive index | 2.67 | — | — | 1.6 |
| | | Average transmittance | 14 | 88 | 3 | 22 |
| | | Difference between reflectances (maximum − minimum) | 0 | 3 | 0 | 1 |
| | | Average reflectance: R | 67 | 11 | 67 | 46 |
| | | Scattering coefficient: S | 0.307 | 0.003 | 0.808 | 0.118 |
| Substrate with attached base film | Substrate: Acrylic resin (black) | Average reflectance of substrate with attached base film: RB | 67 | 13 | 67 | 37 |
| | | Difference between average reflectances \|ΔR\| | 0 | 2 | 0 | 9 |
| | Substrate: Acrylic resin (white) | Average reflectance of substrate with attached base film: RW | 84 | 80 | 68 | 56 |
| | | Difference between average reflectances \|ΔR\| | 17 | 69 | 1 | 10 |
| | Contrast ratio | RB/RW | 0.80 | 0.17 | 1.00 | 0.66 |
| | Substrate: Zinc-plated steel plate | Average reflectance of substrate with attached base film: R | 70 | 42 | 67 | 45 |
| | | Difference between average reflectances \|ΔR\| | 3 | 31 | 0 | 1 |
| Base film when at 20% elongation | | Average transmittance at 20% | 12 | 88 | 50 | 24 |
| | | Difference between transmittances at 20% (maximum − minimum) | 0 | 3 | 0 | 1 |
| | | Average transmittance at 20% − initial average transmittance | −2 | 0 | 47 | 2 |
| | | Average reflectance at 20% | 77 | 11 | 31 | 43 |
| | | Visual defects | No problem | No problem | Cracking occurred | No problem |
| Substrate with attached base film at 20% elongation | Substrate: Acrylic resin (black) | Average reflectance of substrate with attached base film at 20% elongation: RB20 | 66 | 11 | 30 | 43 |
| | | Difference between average reflectances \|ΔR\| | 11 | 0 | 1 | 0 |
| | Substrate: Acrylic resin (white) | Average reflectance of substrate with attached base film at 20% elongation: RW20 | 85 | 80 | 76 | 81 |
| | | Difference between average reflectances \|ΔR\| | 8 | 69 | 45 | 38 |
| | Contrast ratio | RB20/RW20 | 0.78 | 0.14 | 0.39 | 0.53 |
| | Substrate: Zinc-plated steel plate | Average reflectance of substrate with attached base film at 20% elongation: R | 68 | 42 | 32 | 40 |
| | | Difference between average reflectances \|ΔR\| | 9 | 31 | 1 | 3 |

The scattering coefficients at Working Examples 1 through 5 were high. Contrast ratios when at 20% elongation (i.e., RB20/RW20) were also high.

On the other hand, at Comparative Example 1, because the first layer making up the base film did not contain concealing material, the scattering coefficient was extremely low, the contrast ratio when unelongated was extremely low, and the contrast ratio when at 20% elongation was also extremely low. At Comparative Example 2, because an elongation of 20% caused cracking of the aluminum coat that had hiding power, the contrast ratio when at 20% elongation was low. At Comparative Example 3, because the refractive index of the concealing material was low, the scattering coefficient was low, the contrast ratio when unelongated was low, and the contrast ratio when at 20% elongation was also low.

7 . . . composite film; 8 . . . paint substitute film; 9 . . . protective film; 81 . . . base film; 82 . . . colored layer;

83 ... hard coat layer; 811 ... first layer; 812 ... second layer; 4 ... laminated metal plate; 5 ... metal plate

The invention claimed is:

1. A paint substitute film comprising a base film, a colored layer, and a hard coat layer;
    wherein the base film, the colored layer, and the hard coat layer are laminated in this order;
    wherein the base film contains thermoplastic resin and concealing material;
    wherein refractive index of the concealing material is not less than 1.70;
    wherein scattering coefficient from wavelength 400 nm to 700 nm of the base film is not less than 0.20 $\mu m^{-1}$;
    wherein contrast ratio of the base film when at 20% elongation is not less than 0.70;
    wherein the base film comprises a first layer and a second layer which is laminated over the first layer; the first layer is located between the colored layer and the second layer; and the first layer contains the thermoplastic resin and the concealing material; and
    wherein a ratio of thickness of the first layer to thickness of the base film is not less than 0.50 but is not greater than 0.95.

2. The paint substitute film according to claim 1 wherein a difference between a maximum value of total luminous transmittance from wavelength 400 nm to 700 nm at the base film and a minimum value of total luminous transmittance from wavelength 400 nm to 700 nm at the base film is not greater than 10%.

3. The paint substitute film according to claim 1 wherein the thermoplastic resin comprises crystalline resin.

4. The paint substitute film according to claim 1 wherein thickness of the base film is 10 μm to 150 μm.

5. The paint substitute film according to claim 1 wherein the thermoplastic resin comprises polyester resin.

6. The paint substitute film according to claim 1 wherein the concealing material comprises at least either aluminum powder or titanium oxide particles.

7. The paint substitute film according to claim 1 wherein cured state of the hard coat layer is B-stage.

8. The paint substitute film according to claim 1 wherein the scattering coefficient is not greater than 0.50 $\mu m^{-1}$.

9. The paint substitute film according to claim 1 wherein the scattering coefficient is not less than 0.22 $\mu m^{-1}$ but is not greater than 0.40 $\mu m^{-1}$.

10. A composite film comprising (a) the paint substitute film according to claim 1 and (b) a protective film which is disposed over the hard coat layer of the paint substitute film.

11. A laminated metal plate comprising (a) a metal plate and (b) the paint substitute film according to claim 1 which is laminated to the metal plate.

12. A processed article wherein the laminated metal plate according to claim 11 has undergone press processing.

13. A laminated metal plate comprising (a) a metal plate and (b) the composite film according to claim 10 which is laminated to the metal plate.

14. A processed article wherein the laminated metal plate according to claim 13 has undergone press processing.

15. A processed article comprising (a) a metal member for a car and (b) the paint substitute film according to claim 1 which is disposed on at least a portion of a surface of the metal member.

16. A processed article comprising (a) a metal member for a car and (b) the composite film according to claim 10 which is disposed on at least a portion of a surface of the metal member.

17. A molded article comprising (a) a resin member for a car and (b) the paint substitute film according to claim 1 which is disposed on at least a portion of a surface of the resin member.

18. A molded article comprising (a) a resin member for a car and (b) the composite film according to claim 10 which is disposed on at least a portion of a surface of the resin member.

* * * * *